Dec. 23, 1930. H. C. TERRELL ET AL 1,786,369
BATTERY CHARGING CONNECTER
Filed July 30, 1928
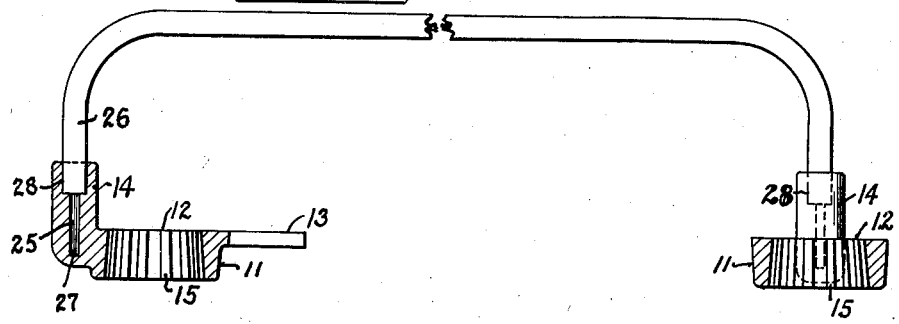
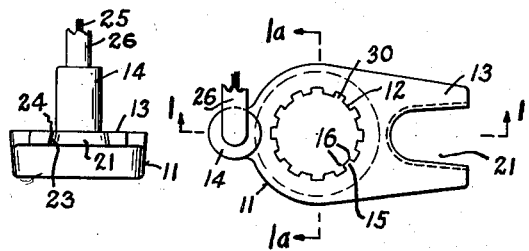
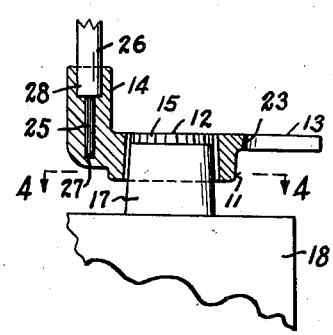
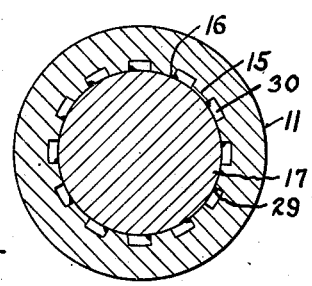
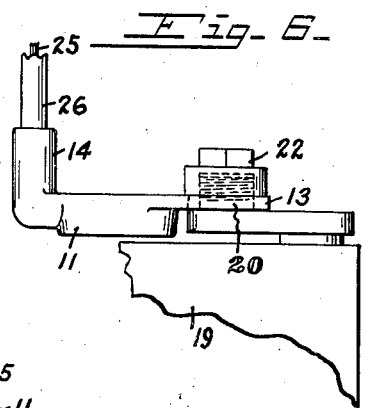
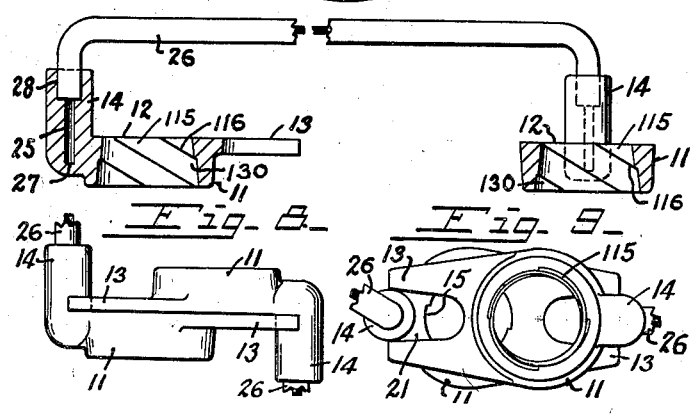
INVENTORS:

Patented Dec. 23, 1930

1,786,369

UNITED STATES PATENT OFFICE

HAROLD C. TERRELL AND FRANK A. KERKHOFF, OF CINCINNATI, OHIO, ASSIGNORS TO THE OHIO PARTS COMPANY, OF CINCINNATI, OHIO, A CORPORATION OF OHIO

BATTERY-CHARGING CONNECTER

Application filed July 30, 1928. Serial No. 296,232.

Our invention relates to battery charging connecters arranged to be received about the terminal posts of storage batteries, used in automobiles, in aeroplanes, for radio receiving sets, and for other purposes, and intended for use primarily by battery service stations for temporary connections with the terminal posts for electrically charging the storage batteries.
These terminal posts in practice are made of lead, and during use of the storage battery become covered with a coating of grease, or with dirt, or films or coatings of other nature, all of which interfere with proper electric transmission.

Most of the battery charging connecters now in general use are made of brass, steel, iron or other readily corrodible metals, and it is an object of our invention to provide a connection made of non-corrodible metal, such as a lead and antimony composition, similar to the composition of the terminal posts of the storage batteries, and of novel structure, which provides a battery charging connecter having longer life, avoids danger from open circuits due to breakage, and insures good electric contact.

It is the object of our invention further to provide a battery connecter which is arranged to scrape and clean the terminal post in the act of applying the connecter to the post for forming electric connection therewith, and which is readily applied and removed, and while applied forms a good electric contact with the terminal post for proper and efficient transmission of the electric current between the battery connecter and the terminal post in charging the battery; and, further, to provide an electric connecter of this character arranged for ready connection either with storage batteries which have standard tapered terminal posts of the character just mentioned, or with radio batteries or similar batteries which usually have clamp connections at their terminals; and, further, to provide a compact battery connecter of the character mentioned in which an insulated electric conductor is imbedded in compact arrangement.
It is the object of our invention further to provide battery charging connecters arranged to be connected with each other in novel manner.

The invention will be further readily understood from the following description and claims, and from the drawings, in which latter:

Fig. 1 represents a side elevation of an insulated electric conductor, partly broken away, and having our improved battery connecter at the respective ends thereof, the battery connecter at the left end of said conductor being shown in vertical section on the line 1—1 of Fig. 2 and the battery connecter at the right being shown in vertical section on the line 1a—1a of Fig. 2.

Fig. 2 is a plan view of our improved device.

Fig. 3 is a side elevation of a storage battery, partly broken away, provided with a tapered terminal post, and having our improved device applied thereto.

Fig. 4 is a cross-section of the same, taken in the plane of the line 4—4 of Fig. 3.

Fig. 5 is an edge elevation of our improved device.

Fig. 6 is a side elevation of a radio storage battery, partly broken away, showing our improved device applied thereto.

Fig. 7 is a view similar to Fig. 1, but showing a modification in that the wall of the bore of the connecter is provided with spiral ribs.

Fig. 8 is a side elevation showing two battery charging connecters attached together; and,

Fig. 9 is a plan view of the same.

Our improved battery connecter comprises a body 11 having a tapered hole 12, a laterally projecting fork 13 at one side of said hole, and a socket-lug 14 at the other side of said hole. The hole is tapered, and the wall thereof is provided with ribs 15, having sharp edges 16. The taper of the wall of the hole corresponds to the usual taper of the usual tapered battery terminal post 17, with which larger storage batteries 18, such as used in automobiles are usually provided. The ribs, which, with their sharp edges, may be termed cutter ribs, preferably extend in substantially the direction of the axis of the hole and converge at one of their ends to conform to the taper of the hole.

Smaller storage batteries, such as radio batteries 19, are provided with clamp terminal posts 20, the fork 13 being received about said post, with the post located in the recess 21 of the fork, and the usual nut 22 of such terminal post clamping the fork in place. The fork is provided with a tapering inner wall 23 which converges toward the inner end of the fork, having a sharp edge 24 with which to scrape the terminal post 20 for making intimate electric contact therewith. The converging walls of the recess 21 permit biting contact to be made with both sides of the post as the post becomes worn, for intimate electric contact between the fork and the post. The fork is located at one side of the hole 12 in close association therewith so that either the hole or the fork may be received about a terminal post. When the wall of the hole 12 is placed about a terminal post, the body is moved in a direction substantially perpendicular to the plane of said body, and when said fork is connected with the terminal post, said body is moved in a direction parallel with said plane.

The insulated electric conductor comprises an electric conductor 25, usually formed of a number of twisted fine strands of wire, and a sheathing 26 of insulation thereabout. In connecting the same with our improved connecter the electric conductor has its end exposed for a distance, as shown at 27. This exposed end of the electric conductor and the proximate end 28 of the sheet of insulation is located in the lug 14, which is part of the body of our improved connecter, and forms intimate mechanical connection therewith. Intimate electrical connection is thus made between the exposed end of the electric conductor and our improved device. The proximate end 28 of the sheath of insulation is received in said lug so as to reinforce the electric conductor in the lug, and resist sharp bending strains upon the electric conductor.

The lug 14 extends from the body 11 in a direction which is substantially perpendicular to the plane of said body, the axes of the lug 14 and of the hole 12 being substantially parallel.

The body of our improved device is preferably of lead, preferably molten and molded about the end of the electric conductor and its sheath of insulation for firmly securing the insulated electric conductor in the body and forming intimate electric connection between the electric conductor and the body.

In applying our improved electric connecter to the battery terminal post shown in Figs. 3 and 4, the wall of the hole 12 is placed about the post and the connecter is rotated, thereby scraping the outer periphery of the post by means of the cutter ribs and removing the deleterious film or coating from said periphery, the removed material, instanced at 29, being received in the spaces 30 between said ribs, whereby the solid material of the post is exposed and intimate electric connection is made between our improved connecter and the post.

The contact thus made is sufficient for electric connection for charging the battery, and a slight rotation and pulling upon the connecter is sufficient for release of the connecter from the terminal post. The attachment and removal of our improved battery connecter with relation to the terminal post is thus easily effected.

In the modification shown in Fig. 7, the ribs are shown as spiral ribs 115, which are arranged spirally on the wall of the hole 12. The ribs 115 have sharp edges 116, by means of which the outer periphery of the terminal post may be scraped and cleaned by rotation and endwise movement of the connecter, to form intimate electric connection between the terminal post and the connecter, and ready attachment and detachment of the connecter. There is a sloping face between each rib and the base of its adjacent rib for forming the bottoms of spaces 130.

The connection between the ribs, whether straight or curved, and the terminal post may be made at any point lengthwise of the terminal post. The diameter of the hole 12 is such that when the terminal post is new, the connecter fits about the upper end of the terminal post, and as the terminal post becomes worn, the connecter finds proper electric connection with the terminal post at different parts along the length of the terminal post, the connecter making its own seat upon the terminal post for proper electric connection therewith.

The lug 14 and the recess 21 are of such relative sizes, forms and relations on the body of the connecters that the connecters on two adjacent connecter structures may be readily connected by reversing one of the connecters upside down and inserting the lug of each in the recess of the other and squeezing the connecters together, whereby good electric connections are made between them without the use of tools. They are readily disconnected by pulling the same apart. Such arrangement is especially useful when charging a line of batteries, the terminals of which are connected with our improved connecters. If it is desired to remove any battery in the line, the connecters may be readily slipped off the terminals of the battery to be removed and slipped upon each other to again connect the circuit for all the other batteries, without disturbing any of the other batteries or their electric connections.

Having thus fully described our invention, what we claim as new, and desire to secure by Letters Patent, is:

1. A battery connecter comprising a body having a hole the wall whereof is provided with sharp-edged ribs arranged for scraping the outer periphery of a tapered battery terminal post for forming good electric connection between said body and said post, a fork at one side of said hole for connection with a battery terminal post, and a lug at the other side of said hole, the axes of said lug and of said hole being substantially parallel, and an insulated electric conductor, said electric conductor having an end extending beyond its insulation, and said end of said electric conductor and the proximate end of said insulation imbedded in said lug.

2. A battery connecter comprising a body having a tapered hole, the wall whereof is provided with sharp-edged ribs extending in length in substantially the direction of the axis of said hole and converging at one of their ends, and arranged for scraping the outer periphery of a tapered battery terminal post for forming good electric connection between said body and said post, a laterally open-ended fork at one side of said hole for connection with a battery terminal post, and a lug at the other side of said hole, and an insulated electric conductor, said electric conductor having an end extending beyond its insulation, said end of said electric conductor and the proximate end of said insulation imbedded in said lug, and arranged for connecting said battery connecter with a terminal post by means of said hole and said fork by movements of said body in respective planes which are substantially right angular with relation to each other.

In testimony whereof, we have hereunto signed our names.

HAROLD C. TERRELL.
FRANK A. KERKHOFF.